C. F. WALLERSTEDT.
MACHINE FOR ROUNDING THE EDGES OF LEATHER BELTS AND THE LIKE.
APPLICATION FILED MAY 18, 1917.

1,266,891.

Patented May 21, 1918.
3 SHEETS—SHEET 1.

Inventor,
Charles F. Wallerstedt
By J. M. Cornwall, Atty.

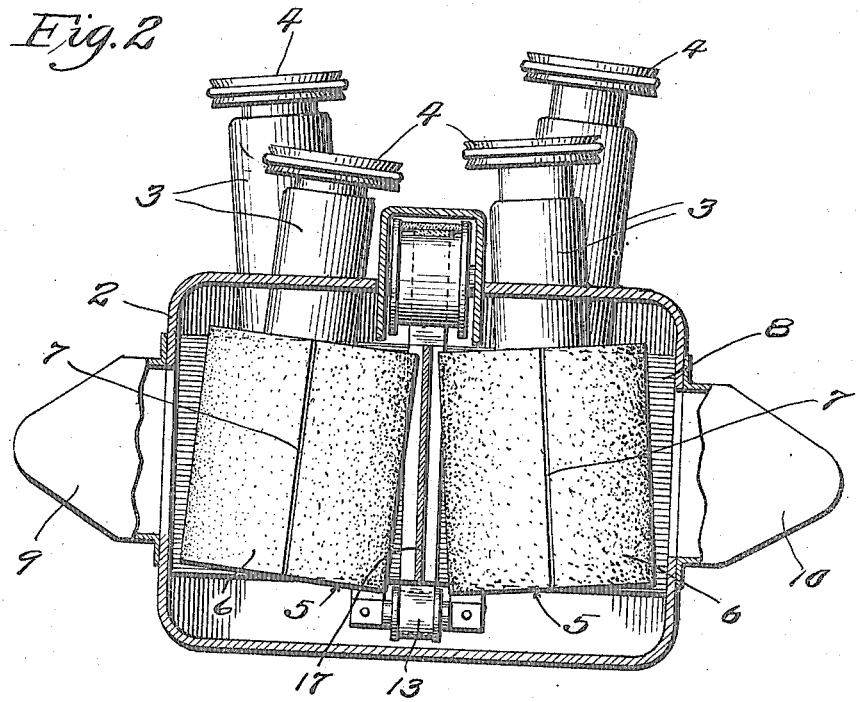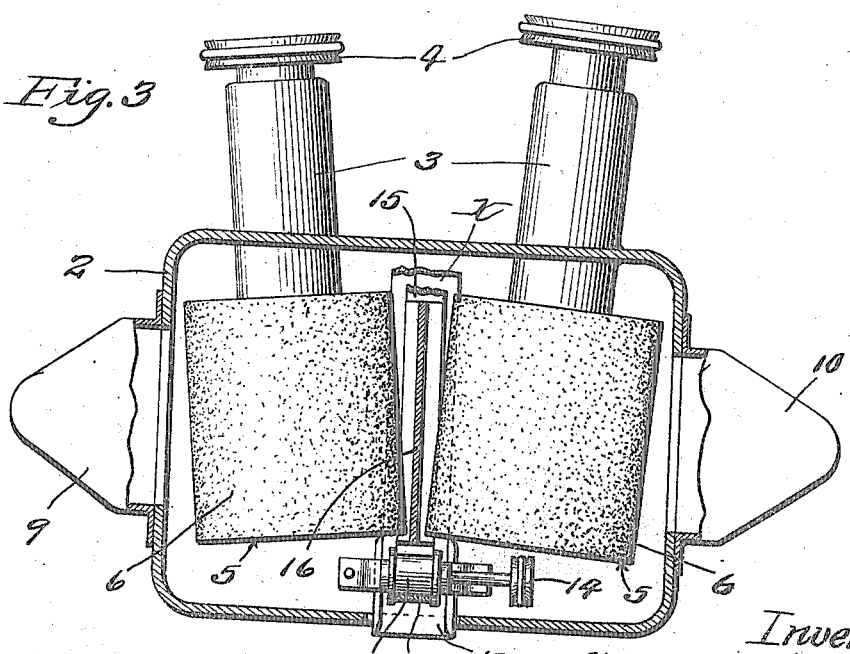

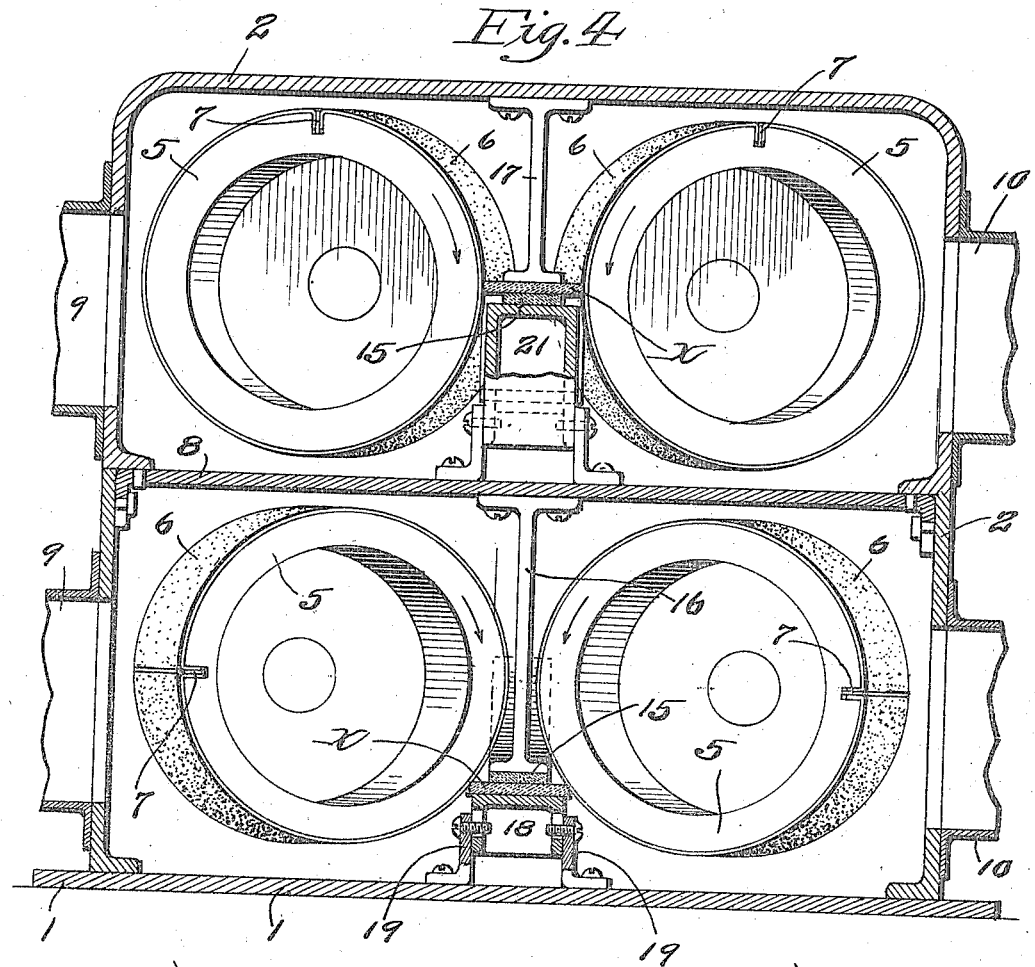
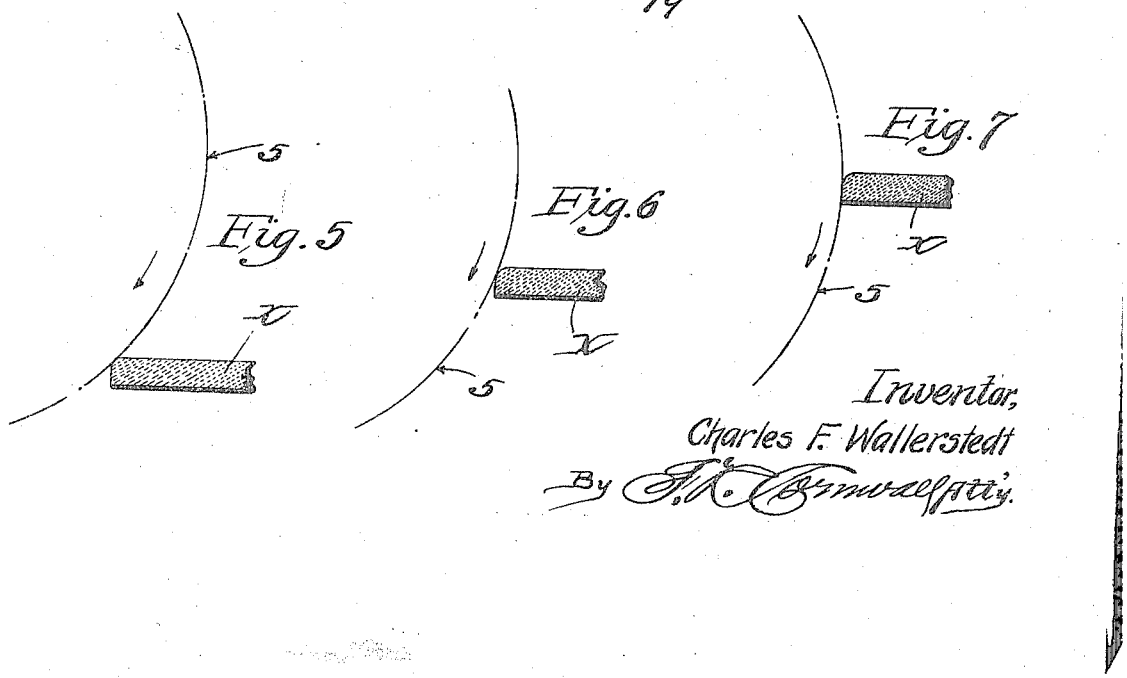

UNITED STATES PATENT OFFICE.

CHARLES F. WALLERSTEDT, OF ST. LOUIS, MISSOURI.

MACHINE FOR ROUNDING THE EDGES OF LEATHER BELTS AND THE LIKE.

1,266,891. Specification of Letters Patent. Patented May 21, 1918.

Application filed May 18, 1917. Serial No. 169,441.

*To all whom it may concern:*

Be it known that I, CHARLES F. WALLERSTEDT, a citizen of the United States, residing at city of St. Louis, State of Missouri, have invented a certain new and useful Improvement in Machines for Rounding the Edges of Leather Belts and the like, of which the following is a full, clear, and exact description, such as will enable others skilled in the art to which it appertains to make and use the same, reference being had to the accompanying drawings, forming part of this specification, in which—

Fig. 2 is a horizontal sectional view on line 2—2 of Fig. 1.

Fig. 3 is a horizontal sectional view on line 3—3 of Fig. 1.

Fig. 4 is a vertical sectional view on the line 4—4 of Fig. 1.

Figs. 5, 6, and 7 are detail views showing the relation of the belt to the grinding wheels in the several stages of operation of the machine.

Figure 1:
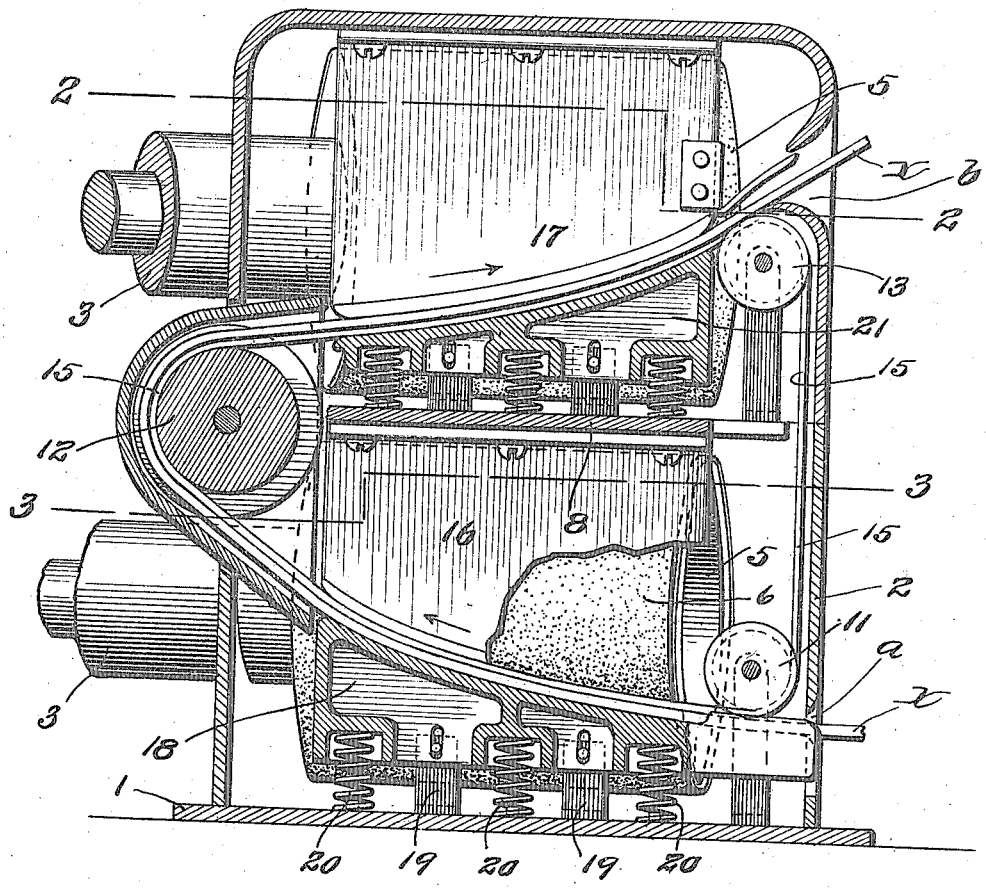
Figure 1 is a vertical longitudinal sectional view through my improved machine.
Figure 8:
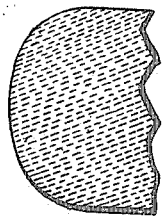

Fig. 8 is an enlarged detail view of the rounded edges produced by my machine.

Figure 9:
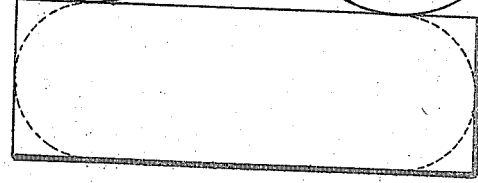

Fig. 9 is a diagrammatic view of a modified form of the machine.

This invention relates to a new and useful improvement in machines for rounding the edges of leather belts and the like, the object being to construct a machine which is simple in character, cheap and one which can be easily operated with a small amount of power.

With these objects in view, my invention consists in the construction, combination and arrangement of the several parts, all of which will hereinafter be described and afterward pointed out in the claims.

In the drawings 1 indicates the base of the machine and 2 a casing or housing in which casing or housing are arranged elongated bearings 3 for supporting the drive shaft of the grinding wheels, the outer ends of which drive shafts are provided with belt driven pulleys 4. It will be understood, however, that any form of driving mechanism may be employed for the grinding wheels. The grinding wheels are preferably in the shape of open ended cylinders 5 mounted on the inner ends of the drive shafts which cylinders are slotted longitudinally to receive the edges of sand paper 6, or some similar grinding medium, said edges being held in place by a wedging strip 7 in a well known manner. The casing or housing 2 is preferably divided into substantially two parts by means of a partition wall 8 and from each chamber thus formed lead pipes 9 and 10 for the purpose of circulating an air current through said chambers to carry off particles of leather and dust removed by the grinding wheel.

The grinding wheels are arranged in pairs, a wheel of each pair being angularly disposed relative to its companion and the disposition or angularity of the two wheels of each pair being oppositely disposed for purposes which will hereinafter appear.

11, 12, and 13 represent feed rollers, one of which may be driven by means of a belted pulley 14, shown in Fig. 3. 15 is a belt passing over these feed rollers, said belt being designed to feed the leather strip or belt whose edges are to be rounded. 16 is a backing shoe arranged between the lower set of grinding wheels and under which the belt 15 passes from the feed roller 11. After leaving this backing shoe, belt 15 passes around roller 12 and then under a backing shoe 17 arranged between the upper pair of grinding wheels, but in this instance, the belt 15 lies under the strip or piece of leather whose edges are being rounded instead of over said strip or piece of leather as when feeding the same between the lower pair of grinding wheels. After passing under the backing shoe 17, belt 15 passes over the roller 13 and thence downwardly to the roller 11.

18 indicates a yielding table or support guided through the medium of slot and pin connections by a post 19 secured to the base plate 1. Springs 20 tend to exert yielding pressure on the table or support 18 tending to lift the same.

21 indicates a spring supported table arranged between the upper pair of grinding wheels and mounted on the partition wall 8. *x* indicates the belt or piece of leather whose edges are to be rounded and which is fed into the machine through the opening marked *a* and which issues from the machine through the opening marked *b*. In entering the end of a belt or strip whose edges are to be rounded, the operator may depress the end of the table 18 until the belt or strip is gripped by the feeding belt 15 after which it is fed forward, being carried under the belt 15 and around the roller 12 until it reaches the shoe 17 whose end is beveled or inclined so as to guide the belt or strip thereunder, the belt or strip eventually issuing through the opening $b$. In its passage through the machine, the belt or strip has its upper corners rounded by the lower pair of grinding wheels (speaking of the belt or strip as it enters the machine), and then as it passes between the upper pair of grinding wheels the opposite edges (which were the lower edges as the belt or strip was introduced into the machine) are rounded so that as the belt or strip issues from the machine its rounding operation is completed and it is only necessary to apply the stain and polish the belt or strip, if such operations are desired, to have the finished product.

In practice, I prefer to have the feeding belt 15 and the bearing surfaces of the shoes 16 and 17 narrower than the belt or strip to be operated upon so as to give the grinding wheels an opportunity to operate properly upon the edges of the belt or strip to be rounded. Assuming that the grinding wheels are operating in the direction of their arrows, upon its first introduction between the lower set of grinding wheels, the belt or strip is first ground, as indicated in Fig. 5, to wit, at or near the upper surface and adjacent each edge. As it passes onward between the diverging grinding wheels, it is fed upwardly so that the action of said wheels is as indicated in Figs. 6 and 7, Fig. 6 being intended to represent the intermediate stage of the grinding action. Fig. 7 represents the final stage where the belt or strip is approximately in the horizontal plane of the axis of the grinding wheels. In this final grinding, it will be noted that loose fibers of leather incident to the initial grinding are removed so that as the belt or strip passes from between the first or lower pair of grinding wheels, it is practically in a semi-rounded and unfinished condition. As it is fed between the upper pair of grinding wheels, first entering under said wheels and being gradually guided upwardly until it is approximately on the horizontal plane of said wheels, but at a point where the space between said wheels is widest, the opposite edges of the belt or strip will be correspondingly ground off, all the loose fibers being removed,—the operation of the machine producing as a resulting product a belt whose edges are rounded and finished so far as the formation is concerned. If one end of the belt or strip is to be tapered or pointed, this can be done by hand as is the practice.

While I have shown a machine comprising four grinding wheels, it is obvious that one pair of grinding wheels can be employed, but in this instance, to finish both sides of the belt or strip it will be necessary to pass the same twice between the grinding wheels. It will also be obvious that where wide sheets of leather are to be rounded, a single grinding wheel can be used, the leather being held in place by suitable supports or guides.

I have not shown in the accompanying drawings any means for adjusting the wheels for different widths of belts or strips, but as this is so well known, the means for accomplishing such adjustment will readily occur to any skilled mechanic.

In the construction shown in Figs. 1 to 5, the edges of the belt or strip are not finished with what may be termed a full half round, the edges rather appearing as shown in Fig. 8.

In Fig. 9, I have shown a modified form in which, in a conventional way, I have illustrated the method of producing the full half round finish which requires the use of relatively small grinding wheels whose diameters must be such that in introducing the belt or strip to the action thereof, they can first operate upon the surface somewhat removed from the edge so as to take a deeper cut at the top (and bottom) necessary to the production of the full half round finish.

While I have described the operation of the machine as that in which the angularly disposed grinding wheels first act upon the upper surfaces or edges of the belt or strip, and finally upon the edges thereof, at the widest point between the grinding wheels and substantially in the horizontal plane of the axis thereof, it is obvious that this direction of movement of the belt or strip between the wheels may be reversed,—that is the grinding wheels, by such reverse movement, can first act on the edges of the belt or strip, and finally as the belt or strip emerges from below, and at the narrowest point of said grinding wheels, upon the surface of the belt or strip. However, I prefer the operation as first described herein as there is less liability in such operation to leave strands or fibers at the finishing point of action of the grinding wheels on the material to be operated upon.

Having thus described my invention what I claim as new and desire to secure by Letters Patent is set forth in the following claims.

I claim:

1. In a machine of the character described, the combination of a grinding wheel and a support for guiding and presenting the material to be operated upon to the action of said wheel approximately lengthwise of, and at varying angles to the axis of rotation of said wheel, the variation in the angle of such presentation changing as the material advances along said wheel.

2. In a machine of the character described, the combination of a pair of grinding wheels arranged at angles relative to each other, and a support for the material to be operated upon, said support presenting the material to the action of said wheels at varying angles relative to their axis of rotation and at different points along their length.

3. In a machine of the character described, the combination of two pairs of grinding wheels arranged at opposite angles relative to each other and designed to successively act upon opposite sides of the material, supports for the material to be operated upon whereby the edges of said material are successively presented at different angles and at different points along the length of said pairs of wheels respectively, the wheels of each pair jointly acting upon one face of the material as it passes therealong.

4. In a machine of the character described, the combination of a grinding wheel and a support for presenting one face of the material to be operated upon to said wheel, said support guiding said material along said wheel so that the angle of operation of the wheel upon the material being operated upon is changed as the material progresses along the grinding wheel until finally the grinding wheel finishes its action upon the material on a different face or edge thereof.

5. In a machine of the character described, the combination of a pair of angularly disposed grinding wheels, a support for the material to be operated upon by said wheels, and a yielding member coöperating with said support for holding said material to the action of the wheels.

6. In a machine of the character described, the combination of a pair of angularly disposed grinding wheels, a curved support for the material to be operated upon by said wheels, and means for feeding the material along said support.

In testimony whereof I hereunto affix my signature this 15th day of May, 1917.

CHARLES F. WALLERSTEDT.

Copies of this patent may be obtained for five cents each, by addressing the "Commissioner of Patents, Washington, D. C."